(12) United States Patent
Herbeck et al.

(10) Patent No.: US 9,959,124 B1
(45) Date of Patent: May 1, 2018

(54) SECURE BYPASS OF LOW-LEVEL CONFIGURATION IN RECONFIGURATION OF A COMPUTING SYSTEM

(71) Applicant: Apple Inc., Cupertino, CA (US)

(72) Inventors: Gilbert H. Herbeck, Livermore, CA (US); Manu Gulati, Saratoga, CA (US); Erik P. Machnicki, San Jose, CA (US); Timothy R. Paaske, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 371 days.

(21) Appl. No.: 14/498,428

(22) Filed: Sep. 26, 2014

(51) Int. Cl.
*G06F 1/32* (2006.01)
*G06F 9/44* (2018.01)

(52) U.S. Cl.
CPC .......... *G06F 9/4401* (2013.01); *G06F 1/3287* (2013.01)

(58) Field of Classification Search
CPC ..... G06F 1/32; G06F 1/26; G06F 1/28; G06F 1/00; G06F 9/44
USPC ....... 713/300, 310, 320, 321, 322, 323, 324, 713/340, 375
See application file for complete search history.

(56) References Cited

U.S. PATENT DOCUMENTS

| | | | |
|---|---|---|---|
| 6,799,258 B1* | 9/2004 | Linde | G06F 11/1466 707/999.202 |
| 8,719,610 B2 | 5/2014 | Nowak et al. | |
| 9,066,043 B2* | 6/2015 | Jung | H04N 5/4403 |
| 9,213,397 B2* | 12/2015 | Jouin | G06F 1/3243 |
| 2010/0077244 A1* | 3/2010 | Nowak | G06F 1/3203 713/324 |
| 2010/0313003 A1* | 12/2010 | Breton | G06F 1/30 713/1 |
| 2012/0096290 A1* | 4/2012 | Shkolnikov | G06F 1/325 713/320 |
| 2012/0166822 A1* | 6/2012 | Kam | G06F 1/3275 713/300 |
| 2012/0254526 A1 | 10/2012 | Kalyanasundharam | |
| 2013/0339589 A1* | 12/2013 | Qawami | G06F 9/30101 711/103 |
| 2014/0082724 A1 | 3/2014 | Pearson et al. | |
| 2014/0095910 A1 | 4/2014 | Conrad et al. | |

* cited by examiner

*Primary Examiner* — Jaweed A Abbaszadeh
*Assistant Examiner* — Keshab Pandey
(74) *Attorney, Agent, or Firm* — Meyertons, Hood, Kivlin, Kowert & Goetzel, P.C.

(57) ABSTRACT

In an embodiment, a system includes a functional unit that remains powered when the remainder of the system is powered off. The functional unit may, in response to a transition from a first power state to a second power state, retrieve configuration information from a read-only memory. In some embodiments, may be configured to store at least a portion of the configured information in a secure portion of a memory included in the functional unit and then lock the secure portion of the memory. The functional unit may then complete the transition to the second power state.

16 Claims, 8 Drawing Sheets

SECURE BYPASS OF LOW-LEVEL CONFIGURATION IN RECONFIGURATION OF A COMPUTING SYSTEM

BACKGROUND

Technical Field

Embodiments described herein are related to the field of systems on a chip (SOCs) and, more particularly, to an always-on block in an SOC.

Description of the Related Art

A variety of electronic devices are now in daily use with consumers. Particularly, mobile devices have become ubiquitous. Mobile devices may include cell phones, personal digital assistants (PDAs), smart phones that combine phone functionality and other computing functionality such as various PDA functionality and/or general application support, tablets, laptops, net tops, smart watches, wearable electronics, etc. Generally, a mobile device may be any electronic device that is designed to be carried by a user or worn by a user. The mobile device is typically battery powered so that it may operate away from a constant electrical source such as an electrical outlet.

Many mobile devices may operate in a "standby" mode much of the time. In the standby mode, the device may appear to be "off," in as much as the device is not actively displaying content for the user and/or not actively performing functionality for the user. In the standby mode, much of the device may indeed be powered off. However, in the background, the device may be listening for phone calls or network packets, checking for alarms, reacting to movement, etc.

Because the mobile devices are often operating from a limited supply (e.g. a battery), energy conservation is a key design consideration for the devices. Including a system on a chip (SOC) can aid in energy conservation, since much of the functionality needed in the device can be included in the SOC. In "standby" mode and other low power modes, it is desirable to power down the SOC to eliminate leakage current losses, which are a significant factor in energy consumption in modern integrated circuit technologies. On the other hand, the SOC is needed for some of the standby functionality mentioned above.

SUMMARY OF THE EMBODIMENTS

Various embodiments of a computing system are disclosed. Broadly speaking, a apparatus and a method are contemplated in which a first functional unit is configured to remain in active power state while each functional unit of a plurality of functional units is in an inactive power state. The first functional unit may be further configured to retrieve configuration information from a memory responsive to a transition from a first power state to a second power state. Power consumed in the second power state may be greater than power consumed in the first power state. The first functional unit may include memory, and may be configured to store at least a portion of the configuration information in a secure portion of a memory. The secure portion of the memory may then be locked by the first functional unit, and the first functional unit may be configured to complete the transition from the first power state to the second power state.

In a non-limiting embodiment, the first functional unit may include a plurality of registers. To lock the secure portion of the memory, the first functional unit may be configured to write a predetermined value into at least one register of the plurality of registers.

In a further embodiment, the first functional unit may include circuitry configured to prevent writes to the secure portion of the memory. To lock the secure portion of the memory, the first functional unit may be configured to activate the circuitry responsive to writing the predetermined value into the at least one register of the plurality of registers.

BRIEF DESCRIPTION OF THE DRAWINGS

The following detailed description makes reference to the accompanying drawings, which are now briefly described.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112(f) interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Figure 1:
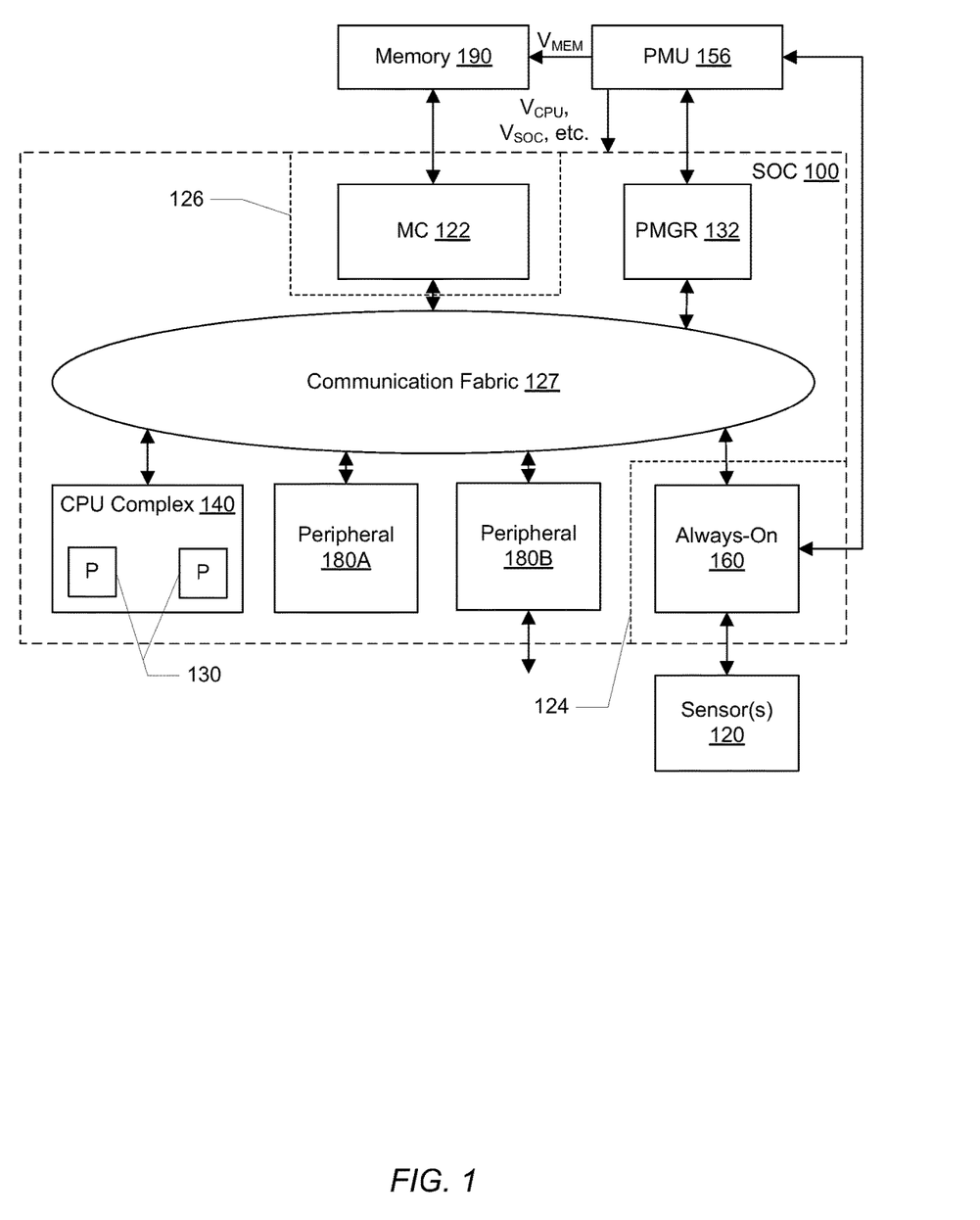
FIG. 1 is a block diagram of one embodiment of an SOC.

Turning now to FIG. 1, a block diagram of one embodiment of an SOC 100 is shown coupled to a memory 190, at least one sensor 120, and a power management unit (PMU) 156. As implied by the name, the components of the SOC 100 may be integrated onto a single semiconductor substrate as an integrated circuit "chip." In some embodiments, the components may be implemented on two or more discrete chips in a system. However, the SOC 100 will be used as an example herein. In the illustrated embodiment, the components of the SOC 100 include a central processing unit (CPU) complex 140, an "always-on" component 160, peripheral components 180A-180B (more briefly, "peripherals"), a memory controller 122, a power manager (PMGR) 132, and a communication fabric 127. The components 140, 160, 180A-180B, 122, and 132 may all be coupled to the communication fabric 127. The memory controller 122 may be coupled to the memory 190 during use. The PMGR 132 and the always-on component 160 may be coupled to the PMU 156. The PMU 156 may be configured to supply various power supply voltage to the SOC, the memory 190, and/or the sensors 120. The always-on component 160 may be coupled to the sensors 120. In the illustrated embodiment, the CPU complex 140 may include one or more processors (P 130 in FIG. 1). The processors 130 may form the CPU(s) of the SOC 100.

The always-on component 160 may be configured to remain powered up when other components of the SOC 100 (e.g. the CPU complex 140, the peripherals 180A-180B, and the PMGR 132) are powered down. More particularly, the always-on component 160 may be on whenever the SOC 100 is receiving power from the PMU 156. Thus, the always-on component is "always-on" in the sense that it may be powered if the SOC 100 is receiving any power (e.g. at times when the device including the SOC 100 is in standby mode or is operating actively), but may not be powered when the SOC 100 is not receiving any power (e.g. at times when the device is completely turned off). The always-on component 160 may support certain functions while the remainder of the SOC 100 is off, allowing low power operation.

In FIG. 1, a dotted line 124 separating the always-on component 160 from the other components may indicate an independent power domain for the always-on component 160. Similarly, in the illustrated embodiment, a dotted line 126 may represent an independent memory controller power domain for the memory controller 122. Other components, groups of components, and/or subcomponents may have independent power domains as well. Generally, a power domain may be configured to receive supply voltage (i.e. be powered on) or not receive supply voltage (i.e. be powered off) independent of other power domains. In some embodiments, power domains may be supplied with different supply voltage magnitudes concurrently. The independence may be provided in a variety of fashions. For example, the independence may be provided by providing separate supply voltage inputs from the PMU 156, by providing power switches between the supply voltage inputs and components and controlling the power switches for a given domain as a unit, and/or a combination of the above. There may be more power domains than those illustrated in FIG. 1 as well. For example, the CPU complex 140 may have an independent power domain (and each CPU processor 130 may have an independent power domain as well) in an embodiment. One or more peripheral components 180A-180B may be in one or more independent power domains in an embodiment.

As illustrated in FIG. 1, the always-on component 160 may be coupled to at least one sensor 120 (and may be coupled to multiple sensors 120). The always-on component 160 may be configured to read the sensor data from the sensors 120 while the SOC 100 is powered off (in addition to the times when the SOC 100 is powered on). The always-on component 160 may include a memory (not shown in FIG. 1) to buffer the sensor data, and the remainder of the SOC 100 need not be powered up unless the memory (or a portion thereof allocated to store sensor data) fills with data (or reaches a threshold level of fullness). In some embodiments, the always-on component 160 may be configured to process the sensor data in some fashion as well. For example, the always-on component 160 may be configured to filter the sensor data. Filtering data may generally refer to one or more of: searching for a pattern or other data properties that indicate that the sensor data should be further processed by the processors in the CPU complex 140; manipulating the data to detect/remove noise in the data; further processing data that appears to match a pattern or other property to eliminate false positive matches; etc.

The sensors 120 may be any devices that are configured to detect or measure aspects of the physical environment of a device that includes the sensors. For example, a sensor may include an accelerometer which measures acceleration of the device. An accelerometer may be directional (measuring acceleration in a predetermined direction) or vector (measuring acceleration in multiple dimensions and producing a vector indicating the acceleration and its direction). Multiple directional accelerometers may be employed to permit vector acceleration sensing as well as directional acceleration sensing. Another example of a sensor may be gyroscope (or gyro). The gyroscope may be used to detect the orientation of the device and/or changes in orientation. Like the accelerometer, the gyroscope may be directional or multidimensional, and/or multiple directional gyroscopes may be used. Yet another sensor may be a magnetometer, which may be used to measure magnetic orientation and thus may be used to form a compass. In other embodiments, the compass functionality may be embedded in the sensor. Another sensor may be an audio detector (e.g. a microphone). The audio detector may capture sound and generate data indicative of the sound. Another sensor may be a photodetector that detects light or other electromagnetic energy. Other exemplary sensors may include an altimeter to detect altitude, a temperature sensor, and/or a pressure sensor. Still another sensor may be a user interface device such as a button, a touch screen, a keyboard, a pointing device, a camera, etc. Any set of sensors may be employed.

As mentioned above, the always-on component 160 may be configured to buffer data in a memory within the component. If the buffer is nearing full, the always-on component 160 may be configured to wake the memory controller 122 in order to write the sensor data to the memory 190. In some embodiments, the always-on component 160 may be configured to write results of filtering the data to the memory 190. In some embodiments, the always-on component 160 may perform other processing tasks while the rest of the SOC 100 is powered down. To the extent that these tasks access the memory 190, the always-on component 160 may be configured to wake the memory controller 122. In addition, the always-on component 160 may be configured to wake at least a portion of the communication fabric 127 (i.e. the portion that connects the always-on component 160 to the memory controller 122).

Using this memory-only communication mode, the always-on component 160 may be able to access the memory 190 and take advantage of the significant storage available in the memory 190 while expending a relatively low amount of energy/power, since the remainder of the SOC 100 remains powered down. The always-on component 160 may store programmable configuration data for the memory controller 122, so that the always-on component 160 may program the memory controller 122 once power is restored. That is, the always-on component 160 may be configured to program the memory controller 122 in a manner similar to the way the operating system would program the memory controller 122 during boot of the device including the SOC 100. The programmable configuration data stored by the always-on component 160 may be the configuration data that was in the memory controller 122 when the SOC 100 (except for the always-on component 160) was most recently powered down, in one embodiment. In another embodiment, the programmable configuration data may be a configuration that is known to work for any previous configuration of the memory controller 122 and/or any configuration of the memory 190. The known-good configuration may, e.g., be a configuration that is acceptable in performance for the memory accesses by the always-on component 160.

When the SOC 100 is powered down with the always-on component 160 remaining powered, part of the power down sequence may be to place the memory 190 in a retention mode. For example, for dynamic random access memory (DRAM) embodiments of the memory 190, the retention mode may be a "self-refresh" mode. In retention mode, the memory 190 may not be externally accessible until the mode is changed. However, the contents of the memory 190 may be preserved. For example, in the self-refresh mode, the DRAM may perform the periodic refreshes needed to retain data (which are normally performed by the memory controller 122, when the memory controller 122 is powered on).

In some embodiments, the always-on component 160 may further store programmable configuration data for other components in the SOC 100. The programmable configuration data may reflect the state of the components at the time that the remainder of the SOC 100 was most recently powered down. The always-on component 160 may be configured to wake the SOC 100 for processing, and may reprogram the components with the stored programmable configuration data. The process of restoring state to the components based on the stored programmable configuration data may be referred to as reconfiguration. Again, similar to the memory-only communication mode discussed above, the state that is restored to the components may be the state at the most recent power down of the component or may be a known-good state with acceptable performance for restarting the SOC 100 for operation. In the latter case, the state may be modified to a higher performance state after the reconfiguration has completed.

Restoring state using the reconfiguration functionality in the always-on component 160 may be a lower latency operation than restoring power in the SOC 100 and then initializing the SOC 100 and the operating system in a manner similar to a cold boot. During the initialization without the always-on component 160, the operating system discovered that the SOC 100 was previously powered down with system state stored in the memory 190, and bypassed some initialization operations. However, the latency of the restore was greater than desired. Additional details for one embodiment are discussed in more detail below.

The always-on component 160 may be configured to communicate with the PMU 156, in addition to the communication of the PMGR 132 to the PMU 156. The interface between the PMU 156 and the always-on component 160 may permit the always-on component 160 to cause components to be powered up (e.g. the memory controller 122, or the other components of the SOC 100) when the PMGR 132 is powered down. The interface may also permit the always-on component 160 to control its own power state as well.

Generally, a component may be referred to as powered on or powered off. The component may be powered on if it is receiving supply voltage so that it may operate as designed. If the component is powered off, then it is not receiving the supply voltage and is not in operation. The component may also be referred to as powered up if it is powered on, and powered down if it is powered off. Powering up a component may refer to supplying the supply voltage to a component that is powered off, and powering down the component may refer to terminating the supply of the supply voltage to the component. Similarly, any subcomponent and/or the SOC 100 as a whole may be referred to as powered up/down, etc. A component may be a predefined block of circuitry which provides a specified function within the SOC 100 and which has a specific interface to the rest of the SOC 100. Thus, the always-on component 160, the peripherals 180A-180B, and the CPU complex 140, the memory controller 122, and the PMGR 132 may each be examples of a component.

A component may be active if it is powered up and not clock gated. Thus, for example, a processor in the CPU complex 140 may be available for instruction execution if it is active. A component may be inactive if it is powered off or in another low power state in which a significant delay may be experienced before instructions may be executed. For example, if the component requires a reset or a relock of a phase lock loop (PLL), it may be inactive even if it remains powered. A component may also be inactive if it is clock gated. Clock gating may refer to techniques in which the clock to the digital circuitry in the component is temporarily "turned off," preventing state from being captured from the digital circuitry in clocked storage devices such as flops, registers, etc.

As mentioned above, the CPU complex 140 may include one or more processors 130 that may serve as the CPU of the SOC 100. The CPU of the system includes the processor(s) that execute the main control software of the system, such as an operating system. Generally, software executed by the CPU during use may control the other components of the system to realize the desired functionality of the system. The processors may also execute other software, such as application programs. The application programs may provide user functionality, and may rely on the operating system for lower-level device control, scheduling, memory management, etc. Accordingly, the processors may also be referred to as application processors. The CPU complex 140 may further include other hardware such as an L2 cache and/or an interface to the other components of the system (e.g. an interface to the communication fabric 127).

An operating point may refer to a combination of power supply voltage magnitude and operating frequency for the CPU complex 140, the always-on component 160, other components of the SOC 100, etc. The operating frequency may be the frequency of the clock that clocks the component. The operating frequency may also be referred to as the clock frequency or simply the frequency. The operating point may also be referred to as an operating state or power state. The operating point may be part of the programmable configuration data that may be stored in the always-on component 160 and reprogrammed into the components when reconfiguration occurs.

Generally, a processor may include any circuitry and/or microcode configured to execute instructions defined in an instruction set architecture implemented by the processor. Processors may encompass processor cores implemented on an integrated circuit with other components as a system on a chip (SOC 100) or other levels of integration. Processors may further encompass discrete microprocessors, processor cores and/or microprocessors integrated into multichip module implementations, processors implemented as multiple integrated circuits, etc.

The memory controller 122 may generally include the circuitry for receiving memory operations from the other components of the SOC 100 and for accessing the memory 190 to complete the memory operations. The memory controller 122 may be configured to access any type of memory 190. For example, the memory 90 may be static random access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g. LPDDR, mDDR, etc.). The memory controller 122 may include queues for memory operations, for ordering (and potentially reordering) the operations and presenting the operations to the memory 190. The memory controller 122 may further include data buffers to store write data awaiting write to memory and read data awaiting return to the source of the memory operation. In some embodiments, the memory controller 122 may include a memory cache to store recently accessed memory data. In SOC implementations, for example, the memory cache may reduce power consumption in the SOC by avoiding reaccess of data from the memory 190 if it is expected to be accessed again soon. In some cases, the memory cache may also be referred to as a system cache, as opposed to private caches such as the L2 cache or caches in the processors, which serve only certain components. Additionally, in some embodiments, a system cache need not be located within the memory controller 122.

The peripherals 180A-180B may be any set of additional hardware functionality included in the SOC 100. For example, the peripherals 180A-180B may include video peripherals such as an image signal processor configured to process image capture data from a camera or other image sensor, display controllers configured to display video data on one or more display devices, graphics processing units (GPUs), video encoder/decoders, scalers, rotators, blenders, etc. The peripherals may include audio peripherals such as microphones, speakers, interfaces to microphones and speakers, audio processors, digital signal processors, mixers, etc. The peripherals may include interface controllers for various interfaces external to the SOC 100 (e.g. the peripheral 180B) including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

The communication fabric 127 may be any communication interconnect and protocol for communicating among the components of the SOC 100. The communication fabric 127 may be bus-based, including shared bus configurations, cross bar configurations, and hierarchical buses with bridges. The communication fabric 127 may also be packet-based, and may be hierarchical with bridges, cross bar, point-to-point, or other interconnects.

The PMGR 132 may be configured to control the supply voltage magnitudes requested from the PMU 156. There may be multiple supply voltages generated by the PMU 156 for the SOC 100. For example, illustrated in FIG. 1 are a $V_{CPU}$ and a $V_{SOC}$.

The $V_{CPU}$ may be the supply voltage for the CPU complex 140. The $V_{SOC}$ may generally be the supply voltage for the rest of the SOC 100 outside of the CPU complex 140. For example, there may be separate supply voltages for the memory controller power domain and the always-on power domain, in addition to the $V_{SOC}$ for the other components. In another embodiment, $V_{SOC}$ may serve the memory controller 122, the always-on component 160, and the other components of the SOC 100 and power gating may be employed based on the power domains. There may be multiple supply voltages for the rest of the SOC 100, in some embodiments. In some embodiments, there may also be a memory supply voltage for various memory arrays in the CPU complex 140 and/or the SOC 100. The memory supply voltage may be used with the voltage supplied to the logic circuitry (e.g. $V_{CPU}$ or $V_{SOC}$), which may have a lower voltage magnitude than that required to ensure robust memory operation. The PMGR 132 may be under direct software control (e.g. software may directly request the power up and/or power down of components) and/or may be configured to monitor the SOC 100 and determine when various components are to be powered up or powered down.

The PMU 156 may generally include the circuitry to generate supply voltages and to provide those supply voltages to other components of the system such as the SOC 100, the memory 190 ($V_{MEM}$ in FIG. 1), various off-chip peripheral components (not shown in FIG. 1) such as display devices, image sensors, user interface devices, etc. The PMU 156 may thus include programmable voltage regulators, logic to interface to the SOC 100 and more particularly the PMGR 32 to receive voltage requests, etc.

It is noted that the number of components of the SOC 100 (and the number of subcomponents for those shown in FIG. 1, such as within the CPU complex 140) may vary from embodiment to embodiment. There may be more or fewer of each component/subcomponent than the number shown in FIG. 1.

Figure 2:
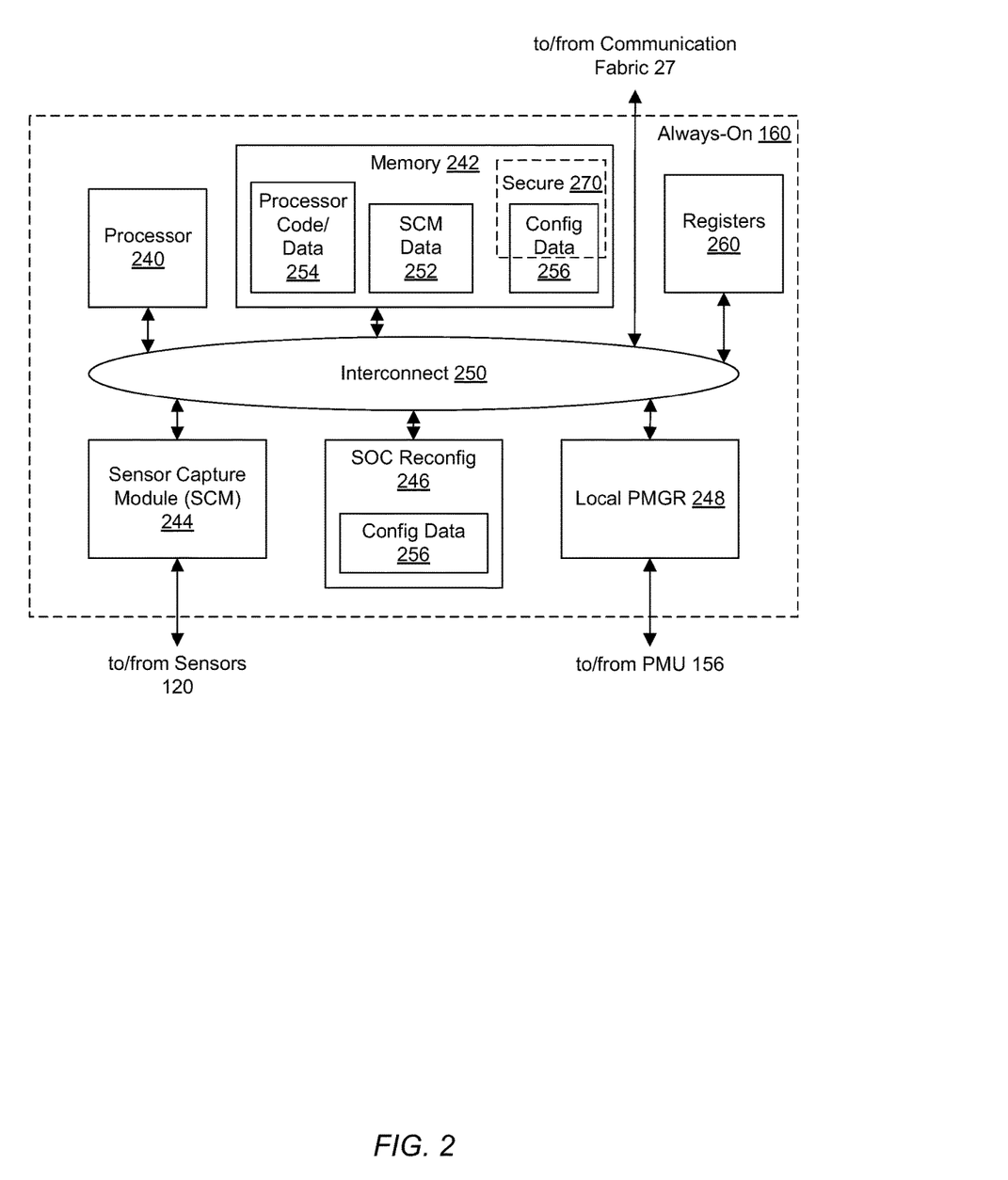
FIG. 2 is a block diagram of one embodiment of an always-on block in the SOC.

Turning now to FIG. 2, a block diagram of one embodiment of the always-on component 160 is shown. In the illustrated embodiment, the always-on component 160 may include a processor 240, a memory 242, a sensor capture module (SCM) 244, an SOC reconfiguration circuit 246, a local PMGR 248, lockable registers 260, and an interconnect 250. The processor 240, the memory 242, the SCM 244, the SOC reconfiguration circuit 246, lockable registers 260, and the local PMGR 248 are coupled to the interconnect 250. The SCM 244 may also be referred to as a sensor capture unit or a sensor capture circuit.

The sensor capture module 244 may be coupled to the sensors 120 when the SOC 100 is included in a system, and may be configured to capture data from the sensors 120. In the illustrated embodiment, the sensor capture module 244 may be configured to write the captured sensor data to the memory 242 (SCM Data 252). The memory 242 may be an SRAM, for example. Any type of memory may, however, be used in other embodiments.

In various embodiments, memory 242 may include secure region 270. Data may be stored in secure region 270 by previous approved software (also referred to herein as "trusted software"). In some embodiments, data stored in the secure region may include a portion of reconfiguration information that is regarded as secure data, or any other suitable data. Trusted software may also store information in lockable registers 260. Such information may include data that may be used by reconfiguration circuit 204 to retrieve secure configuration information from secure region 270. It is noted that although secure region 270 is depicted as being a single region, in other embodiments, secure region 270 may include multiple regions that are not contiguous within memory 242.

During operation, further writes to secure region 270 may be inhibited, thereby preserving the data stored in secure region 270 and preventing undesired changes in the data by software that is not approved to make such changes (also referred to herein as "untrusted software"). The secure area may, in various embodiments, be defined as a base address and size (also referred to as an "aperture"). The base address and size may be stored in one or more of lockable registers 260. In some embodiments, once trusted software has stored data in secure region 270 and lockable registers 260, further updates to secure region 270 and lockable register 260 are prevented (commonly referred to as being "write locked"). In various embodiments, by concurrently write locking both secure region 270 and lockable registers 260, tampering of important system setting by untrusted software may be prevented.

Lockable registers 260 may include one or more registers, each of which may include one or more data storage cells, each configured to store a data bit. Once data has been stored in lockable registers 260, a write lock register (which may be included in lockable registers 260, in some embodiments) may be set. Writing a predetermined data value to the write lock register may, in some embodiments, prevent further updates to the lockable registers 260 as well as secure region 270, until power is removed from always-on component 160. In some embodiments, additional write inhibit circuitry (not shown) may be activated in response to the writing of the predetermined value into the write lock register to prevent further updates to the contents of the lockable registers as well as the secure region. Lockable registers 260 may, in various embodiments, store values defining a base address and a size of secure region 270 of memory 242. In some embodiments, a pointer to an address in memory 190 containing instructions for a power state change may also be stored in lockable registers 260. Although a single write lock register is disclosed, in other embodiments, multiple write lock registers may be employed, thereby allowing for different portions of secure region 270 and corresponding portions of lockable registers 260 to be locked at different times or in response to different conditions.

The SCM data 252 may be stored in locations that are preallocated by the always-on component 160 to store captured sensor data. As the locations are consumed, the amount of available memory to store captured data decreases. The sensor capture module 244 may be programmed with a watermark or other indication of fullness in the allocation memory area (generally, e.g., a "threshold"), and the sensor capture module 244 may be configured to wake the memory controller 122 to write the captured sensor data to memory 190. Alternatively, the processor 240 may be configured to write the captured sensor data to memory 190. In such a case, the sensor capture module 244 may be configured to wake the processor 240.

The processor 240 may be configured to execute code stored in the memory 242 (processor code/data 254). The code may include a series of instructions which, when executed, cause the processor 240 to implement various functions. For example, the code may include filter code which may be executed by the processor 240 to filter the SCM data 252, as discussed above. Responsive to detecting a desired pattern or other data attribute(s) in the SCM data 252, the processor 240 may be configured to wake the memory controller 122 to update the memory 190 and/or to wake the SOC 100.

The processor code/data 254 may be initialized upon boot of a device including the SOC 100. The code may be stored in a non-volatile memory on the SOC 10 or elsewhere in the device, and may be loaded into the memory 242, for example. A local non-volatile memory such as read-only memory (ROM) may also be used in some embodiments.

In an embodiment, the processor 240 may be a smaller, more power efficient processor than the CPU processors 130 in the CPU complex 140. Thus, the processor 240 may consume less power when active than the CPU processors 130 consume. There may also be fewer processors 240 than there are CPU processors 130, in an embodiment.

The SOC reconfiguration circuit 246 may be configured to store the programmable configuration data 256 for the memory controller 122 and the other components of the SOC 100, to reprogram various components responsive to powering the components back up from a powered off state. Alternatively, the programmable configuration data 256 may be stored in the memory 242, or in a combination of the memory 242 and the SOC reconfiguration circuit 246. The configuration data 256 may be written to the circuit 246 by the CPU processors 130, e.g. as part of programming the corresponding component. That is, the CPU processors 130 (executing operating system software, for example, as part of the boot of the device and/or at other times when the configuration is changed) may write the data to the SOC reconfiguration circuit 246. Alternatively, in some embodiments, the SOC reconfiguration circuit 246 may have hardware that monitors and shadows the configuration state. In some embodiments, at least a portion of the programmable configuration data 256 may be predetermined and may be stored in a non-volatile memory such as a ROM, rather than being written to the memory 242 and/or the SOC reconfiguration circuit 246.

In an embodiment, the SOC reconfiguration circuit 246 may include logic circuitry configured to process the programmable configuration data 256 and to write the data to the corresponding components in the SOC 10 after the SOC 100 is powered up again. The programmable configuration data 256 may include a series of register addresses to be written and the data to write to those registers. In some embodiments, the programmable configuration data 256 may further include read commands to read registers, e.g. polling for an expected value that indicates that the initialization performed by various writes is complete and/or the corresponding state is in effect in the component. The expected value may be the entire value read, or may be a portion of the value (e.g. the expected value may include a value and a mask to be applied to the read value prior to comparison). In some embodiments, the programmable configuration data 256 may further include read-modify-write commands to read registers, modify a portion of the read data, and write the modified data back to the register. For example, a second mask may be used to determine which portion of the register value is to be updated. The portion of the register masked by the second mask may not be updated when the value is written to the register.

In another embodiment, the SOC reconfiguration circuit 246 may include another processor and corresponding memory storing code for the processor (or the code may also be stored in the memory 242). The code, when executed by the processor, may cause the processor to configure the various components in the SOC 100 with the programmable configuration data 256. The code may implement the polling features described above as part of the structure of the code itself, or the programmable configuration data 256 may store the address to poll and the expected value, similar to the above discussion. In another embodiment, the processor 240 may execute software to reprogram the components of the SOC 100.

The programmable configuration data 256 may include data for the memory controller 122, separate data for other components of the SOC 100, and separate data for the reconfiguring the processor 240 when it is powered up. When powering up the memory controller 122 while the remainder of the SOC 100 is powered down, the data for the memory controller 122 may be processed. The data may include programmable configuration data for the memory controller 122. The data may further include additional programmable configuration data, in an embodiment. For example, programmable configuration data for the communication fabric 127 may be included. Programmable configuration data may be included for whichever components are used in communication between the always-on component 160 and the memory controller 122. When powering up the remainder of the SOC 100, the data for the other components may be processed. Similarly, when powering up the processor 240, the programmable configuration data for the processor 240 may be processed.

In some embodiments, the SOC reconfiguration circuit 246 may be configured to provide programmable configuration data to components of the SOC 100 at more than one point in the power up of the SOC 100. For example, some programmable reconfiguration data may be provided near the beginning of the transition to powered on (e.g., shortly after the power supply voltage is stable), and other programmable reconfiguration data may be provide nearer the end of the transition to powered on. Furthermore, in some embodiments, the programmable configuration data 256 may be only a portion of the programmable configuration to be established in the components of the SOC 100. The remainder of the programmable configuration may be stored in the memory 190. For example, operating system software executing on the CPU processors 30 may capture the programmable configuration in the memory 190 prior to powering down. The restoration of programmable configuration data stored in the memory 190 may be performed by the SOC reconfiguration circuit 246, other hardware, and/or the operating system software after the CPU processors 130 have been released from reset and begin execution again.

The local PMGR 248 may be configured to handle power management functions within the always-on component 160, in a manner similar to the PMGR 132 in FIG. 1 for the SOC 100 as a whole. The always-on component 160 may support multiple power states, and the local PMGR 248 may assist with transitions between those states. The local PMGR 248 may be configured to communicate with the PMU 156 to support state changes, as well as to manage the providing of supply voltages to various components of the SOC 100 as part of waking up or putting to sleep various components.

The interconnect 250 may comprise any interconnect to transmit communications between the various subcomponents shown in FIG. 2, as well as to communicate over the communication fabric 127 with other components of the SOC 100. The interconnect may include any of the examples of the communication fabric 127 discussed above with regard to FIG. 1, as desired, in various embodiments.

Figure 3:
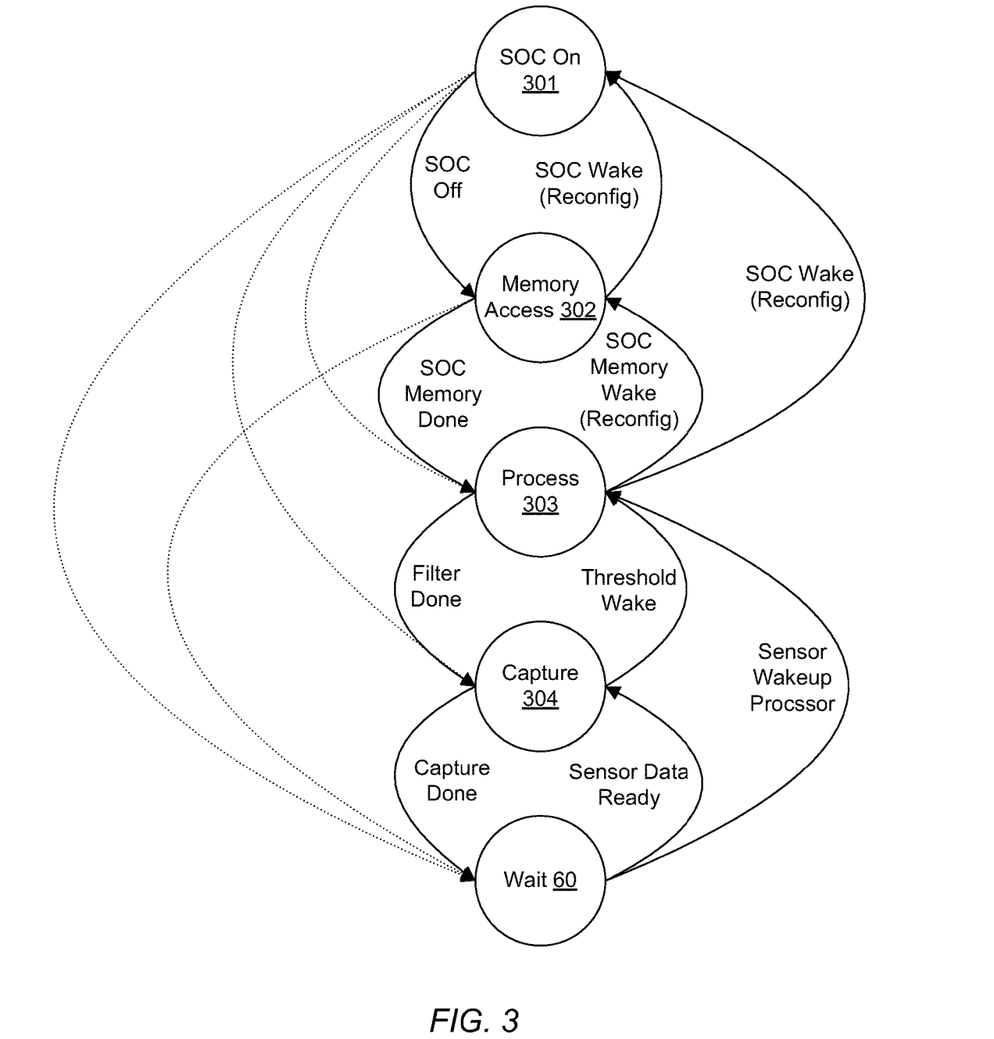
FIG. 3 is a block diagram of one embodiment of a state machine for the always-on block shown in FIG. 2.

Turning now to FIG. 3, a block diagram of one embodiment of a state machine that may be implemented in one embodiment of an always-on component, such as always-on component 160 of FIG. 1, is shown. In the illustrated embodiment, the states include a wait state 305, a capture state 304, a process state 303, a memory access state 302, and an SOC on state 301. Transitions between the states are illustrated with solid lines, and certain additional possible transitions are indicated with dotted lines. Not all possible transitions are illustrated in FIG. 3 to avoid obscuring the drawing.

The states illustrated in FIG. 3 may be in order of relative power/energy consumption, with the wait state 305 being the lowest-power state and the SOC on state 301 being the highest-power state. In the wait state 305, the subcomponents of the always-on component may be either power gated or clock gated. For example, in an embodiment, a processor of the always-on component, such as, e.g., processor 240 of FIG. 2, may be power gated and other functional units, such as, e.g., SCM 244, SOC reconfiguration circuit 246, and local PMGR 248, may be clock-gated. Memory included in the always-on component (e.g., memory 242) may be in retention mode or may be powered normally. It is noted that any combination of clock gating and power gating may be used among the subcomponents.

In the wait state 305, the always-on component may be essentially idle. The state machine may transition from the wait state 305 to the capture state 304 when sensor data is ready to be captured. In one embodiment, a timer (e.g. a watchdog timer) within the always-on component (not expressly shown in FIG. 2) may periodically cause the transition from the wait state 305 to the capture state 304. There may or may not be sensor data to capture in this case. In one embodiment, the sensors may assert a signal to the always-on component to indicate that sensor data is available for capture. In either case, the transition to the capture state 304 may be performed.

In the illustrated embodiment, the state machine may also transition directly from the wait state 305 to the process state 303. This transition may be supported if a sensor is configured to signal the always-on component that processor support is desired. The signal may be separate from the signal to indicate that sensor data is available, for embodiments that implement the signal. The transition may support rapid processing of the sensor data (e.g. filtering) for example, or may be used if a rapid wakeup of the SOC is desired (which may be managed by software executing on the processor of the always-on component). For example, a button or other user interface device that indicates a user's desire to interact with the device may be an event that would cause rapid wakeup of the SOC. If the always-on component processor is power gated in the wait state 305, the transition from the wait state 305 to the process state 303 may include powering up the processor of the always-on component, and resetting and initializing the processor. In other embodiments, the transition from the wait state 305 may pass through the capture state 304, but not remain in the capture state 304. This implementation may reduce complexity with a slightly longer wakeup time for the processor of the always-on component.

In the capture state 304, a sensor capture module (SCM), such as, e.g., SCM, may be active and may be sampling data from one or more sensors, such as, sensors 120, for example. The SCM may write the captured sensor data to a memory (e.g., memory 42). The SCM may also write additional data to the memory, such as a timestamp associated with the captured sensor data, a sensor identifier, etc. Any desired additional data may be stored in the memory. In one embodiment, the timestamp may be the time at which the sensor data was sensed by a given sensor, which may be before the data is captured by the SCM. Alternatively, the timestamp may be the time of the sensor data capture by the SCM.

The SCM may detect one or more thresholds at which the SCM may be configured to wake the processor in the always-on component to process the data. The thresholds may include, e.g., a relative fullness of the captured data in the memory, a number of sensor samples taken, an elapsed time since the first sample, a wakeup timer that is not triggered by samples, an error detection, etc. Any set of one or more thresholds may be used, and different thresholds may be used for different sensors. If the threshold is reached, the state machine may transition from the capture state 304 to the process state 303. Alternatively, if the sensor data capture is complete, the state machine may transition from the capture state 304 to the wait state 305.

In the process state 303, the processor of the always-on component may be active and executing code from an associated memory, such as, e.g., memory 242, or a cache memory of processor 240's, if any. The code may include, e.g., filter code. During the process state 303, the SCM may be periodically active to capture additional sensor data, or may be active continuously in the process state 304. The code executing on the processor may determine that it has completed, at least temporarily, and may cause a transition back to the capture state 304. Alternatively, the transition may be directly to the wait state 305 (e.g. if the SCM is inactive).

The code may also determine that communication with the memory 190 is desired in the process state 303. For example, communication with memory 190 may be used to write captured sensor data from the memory 242 to the memory 190, to make use of the larger available storage space in the memory 190. In some embodiments, the memory 190 may also store additional code executable by the processor 240 (e.g. additional filtering algorithms) that may not be continuously stored in the memory 242. The additional code may be executed by the processor 240 after communication with the memory 190 is established. For example, the additional code may be fetched from the memory 190 into the memory 242 and/or may be cached by the processor 240. The data may be written from the memory 242 to the memory 190 responsive to the processor 240 detecting a desired pattern or other aspect in the captured sensor data, and additional processing by the CPU processors 130 in the CPU complex 140 may be warranted. The data may be written to the memory 190 so that the CPU processors 130 have access to it. If communication with the memory 190 is desired, the state machine may transition to the memory access state 302. The transition may include operation by the SOC reconfiguration circuit 246 to program the state of the memory controller 122 as well as a communication path from the always-on component 160 to the memory controller 122.

In some embodiments, the entire communication fabric 127 may be activated. In other embodiments, only the portion of the communication fabric 127 that is involved in communication between the memory controller 122 and the always-on component 160 may be activated. The memory 190 may also be brought out of self refresh. In an embodiment, the local PMGR 148 may also be involved in the transition, requesting power up of the memory controller 122 if the memory controller supply voltage is managed by the PMU 156.

In the memory access state 302, the memory controller 122 may be active and the always-on component 160 may have access to the memory 90. The always-on component 160 (and more particularly the processor 240, in an embodiment) may be configured to generate read and write operations to the memory 190, which may be carried over the interconnect 250 and the communication fabric 127 to the memory controller 122. Data may be returned by the memory controller 122 (for reads) or received by the memory controller 122 (for writes) in a similar fashion.

The processor 240 may determine that the need to access the memory 190 has ended, and may cause a transition back to the process state 303. The transition may include returning the memory 190 to self refresh mode and powering down the memory controller 122 and the communication fabric 127.

The processor 240 may also determine that the SOC 100 is to be awakened (e.g. to handoff processing to the CPU complex 140). The state machine may transition from the memory access state 302 to the SOC on state 301. The transition may include the local PMGR 248 requesting power up for the SOC 100 from the PMU 156 and may include the SOC reconfiguration circuit 246 programming various components from the configuration data 256. In one embodiment, a transition directly from the process state 303 to the SOC on state 301 may be supported. In such a transition, power up of the memory controller 122 and removal of the memory 190 from self refresh may be performed as well. Alternatively, the processor 240 may detect a desire to transition to the SOC on state 301 but may pass through the memory access state 302 to perform the transition.

From the SOC on state 301, the SOC 100 (e.g. the PMGR 132 and/or the software executing on the CPU processors 130) may determine that the SOC 10 is to transition to a lower power state. In one embodiment, the software may perform a "suspend to RAM" operation in which various system state, including the state also represented by the configuration data 256, is written to the memory 190 before the memory 190 is placed in self refresh and the SOC 100 components are powered down. Thus, upon return to the SOC on state 301, the reprogramming of state from the configuration data 256 may be performed and then the software may resume execution based on the data stored in the memory 190. The transition may be relatively quick, e.g. as compared to if the always-on component 160 were not included. In such a case, software may begin the normal cold boot process. At some point in the process, the software may recognize that the suspend to RAM had occurred, but some unnecessary initialization processing may have already been performed at that point in the process.

Generally, operations performed in lower power states may also be performed while the state machine is any of the higher power states as well. For example, sensor data capture may also be performed while the state machine is in the process state 303, the memory access state 302, and the SOC on state 301 (e.g. if one of the triggers that causes the SCM 244 to capture data occurs while the state machine is any of the other states). Similarly, the processor 240 may be active an any of the process state 303, the memory access state 302, and the SOC on state 301 and thus may process data in any of these states.

If the SOC 100 shuts down, the state machine may return from the SOC on state 301 to the memory access state 302 (and may transition to lower states based on other activity in the always-on component 160). Alternatively, a transition from the SOC on state 301 directly to any of the states 305, 304, 303, or 302 may be performed based on the current activity in the always-on component 160 at the time the transition occurs.

Figure 4:
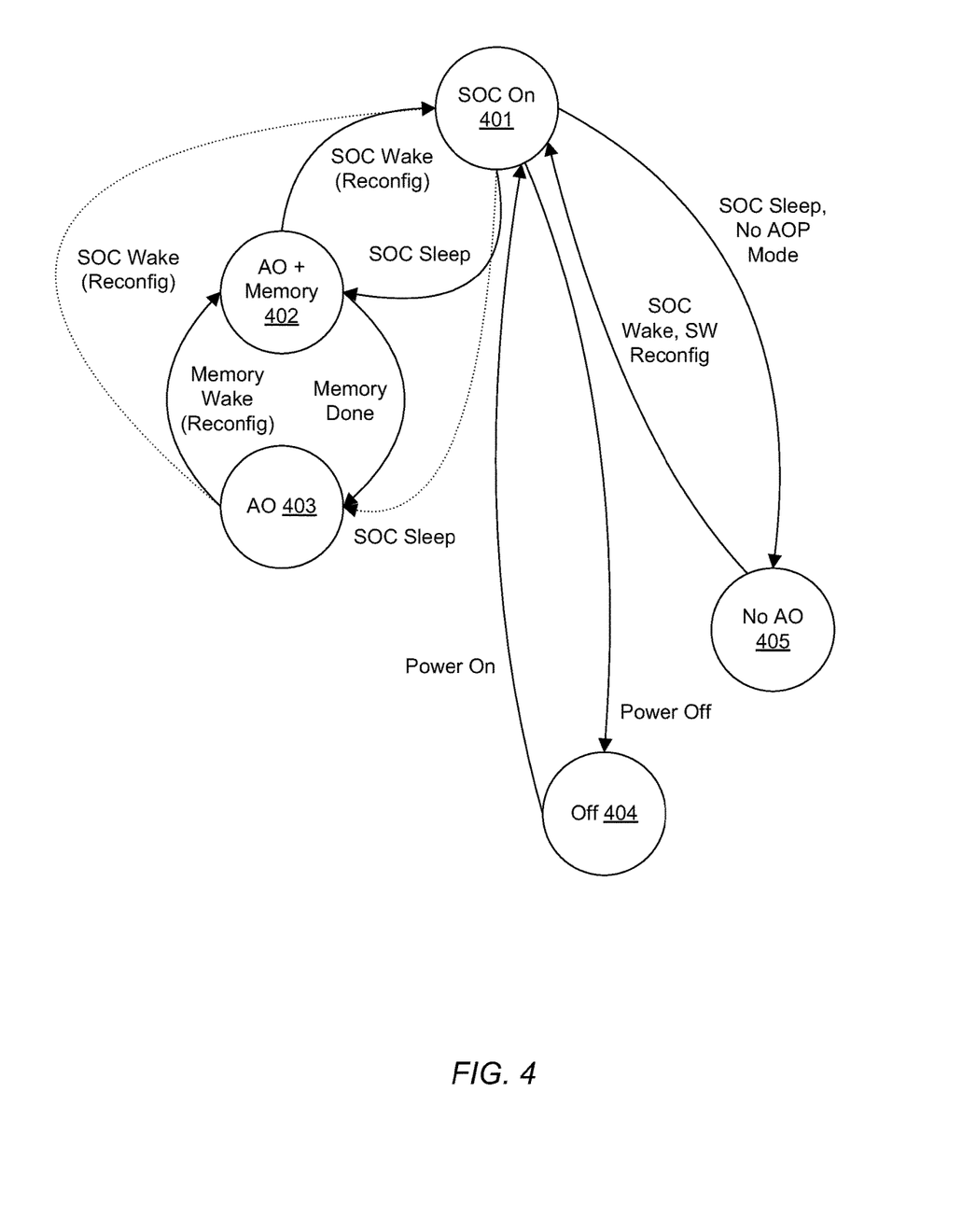
FIG. 4 is a block diagram of another embodiment of a state machine for the always-on block shown in FIG. 2.

Turning now to FIG. 4, a block diagram of another state machine is shown. The state machine in FIG. 4 may be implemented in concert with the state machine of FIG. 3. In the illustrated embodiment, the state machine includes an off state 404, on SOC On state 401, an AO+memory state 402, an AO state 403, and a No AO state 405. AO in this context may be an acronym for always-on.

The off state 404 may be the state in which all power to the SOC 100 is off, such as when the device including the SOC 100 is completely off. Accordingly, the state machine may transition from the off state 404 (e.g. to the SOC On state 401) in response to the power being turned on to the SOC 100. A reset of the SOC 100 may be performed, and then the SOC 100 may proceed to boot. The state machine may transition from the SOC On state 401 to the off state 404 in response to powering off the SOC 100 completely. The power off may occur after software executing on the CPUs 130 has saved any desired state from memory 190 to non-volatile memory, closed down various connections that the device may have (e.g. wireless and/or wired network connections, wireless phone connections, etc.), and otherwise have prepared the device for an orderly shutdown. While the transition is from the SOC On state 401 to the off state 404 in FIG. 4, transitions from the other states to the off state 404 may be supported in other embodiments.

In the SOC On state 401, the SOC 100 may be in full operation. Various components of the SOC 100 may be powered on or powered off as desired, but the SOC 100 as a whole may generally be viewed as active in the SOC On state 401. The SOC On state 401 may correspond to the SOC On state 301 in the embodiment of FIG. 3.

In the SOC On state 401, the software executing on the CPU complex 140 may determine that the SOC 100 should go to a low power state (e.g. sleep). In an embodiment, the software may perform a "suspend to RAM" operation, in which various SOC state is written to the memory 190 prior to powering down the SOC 100. The memory 190 may be placed in a "self refresh" mode in which it maintains the memory contents but is not active on the memory interface to the memory controller 122. The PMGR 132 may communicate power down commands to the PMU 156 to cause the power down of the components in the SOC 100 other than the memory controller 122, the fabric 127 (or portion thereof that is used to communicate between the memory controller 122), and the always-on component 160. Alternatively, the local PMGR 248 may transmit the power down commands. The state machine may transition to the AO+memory state 402. In some embodiments, a transition from the SOC On state 401 to the AO state 402 may be supported as well. Alternatively, the transition from the SOC On state 401 to the AO state 403 may pass through the AO+memory state 402. That is, if the target state is the AO state 403, the transition to the AO+memory state 402 may be made, followed by the transition to the AO state 403.

In the AO+memory state 402, the memory controller 122, the communication fabric 127 (or the portion to the always-on component 160) and the always on component 160 may be active. The AO+memory state 402 may correspond to the memory access state 302 in FIG. 3. If an event that causes the SOC to wake up is detected, the state machine may transition to the SOC On state 401 (powering up the other components of the SOC 100 via communication with the PMU 156 and/or power switches in the SOC 100 and reconfiguring the components via the SOC reconfiguration circuit 246 and/or from data in the memory 190, in various embodiments).

On the other hand, the always-on component 160 may determine that memory access is completed and may deactivate the memory controller 122 (after placing the memory 190 in a retention mode such as self-refresh). The memory controller 122 may be powered down and the always-on component 160 may remain powered. The state machine may transition to the AO state 403. The AO state 403 may correspond to any of the process state 303, the capture state 304, and the wait state 305 in FIG. 3. If the always-on component 160 determines that memory access is desirable again (e.g. due to reaching various thresholds in the SCM data 252 or detecting patterns/attributes via the processor 240), the state machine may transition to AO+memory state 403 (powering the memory controller 122 and the communication fabric 127 and reconfiguring the same via the SOC reconfiguration circuit 246). In some embodiments, a direct transition from the AO state 403 to the SOC On state 401 may be supported, including powering up the memory controller 122, the communication fabric 127, and other components of the SOC 100 and reconfiguring those components via the SOC reconfiguration circuit 246.

In one embodiment, the No AO state 405 may be supported. The No AO state 405 may be a state in which the always-on component 160 is powered down but the memory 190 remains powered in retention mode. The No AO state 405 may be similar to a "classic" suspend to RAM state. Returning from the No AO state 405 to the SOC On state 401 may include software reconfiguring the components of the SOC 100, including the always-on component 160. The software may execute on the CPU processors 130. Thus, the transition from the no AO state 405 to the SOC On state 401 may include basic boot operations until software has initialized the SOC 100 and has detected that memory 190 is storing state already.

Figure 5:
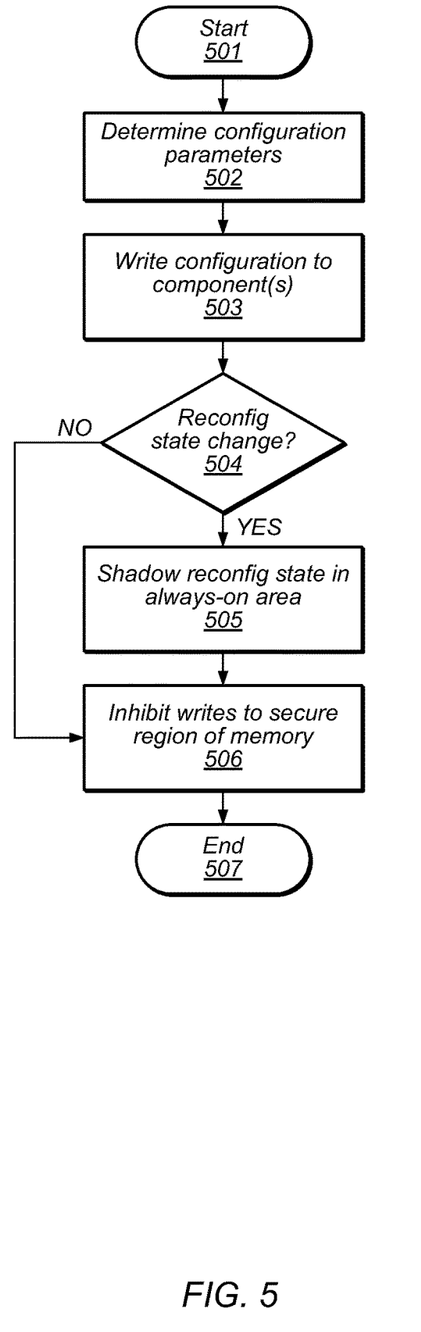
FIG. 5 is a flowchart illustrating operation of one embodiment of software executing on a CPU in the SOC during boot or configuration change.

Turning next to FIG. 5, a flowchart is shown illustrating a method of operation of one embodiment of software code that may be executed on the SOC 100 (e.g. by the CPU processors 130). The code may be executed at boot of a device that includes the SOC 100. The code may similarly be executed during a change in programmable configuration of a component. The code executing during a configuration change may or may not be the same code that is executed during boot, in various embodiments. In other embodiments, portions of the operation shown in FIG. 5 may be implemented in hardware.

The code may include instructions which, when executed on a processor, implement the operation illustrated in FIG. 5. In an embodiment, the code implementing the operation shown in FIG. 5 may be part of the driver code for a corresponding component, and thus the operation illustrated in FIG. 5 may be implemented in multiple code sequences. In some embodiments, the code may also include instructions for writing values in lockable registers 260, setting the size of secure region 270 of memory 242. The method begins in block 501.

The code may determine the configuration parameters to be programmed into the component (block 502). The parameters maybe based on discovering the component and its capabilities. While components in the SOC 100 may be fixed because they are implemented in hardware, the code may be general purpose to run on multiple versions of the SOC 100. Furthermore, the SOC 100 may be included in multiple, differently-designed devices. The desired parameters may be affected by the particular device in which the SOC 100 is instantiated.

The code may write the configuration parameters to the component (block 503), programming the component. The method may then depend on if the configuration parameters include data that is to be restored upon repowering the SOC 100 after a sleep state or other power down state (block 504). If the configuration parameters include data to be restored after a sleep or other power down state, then the configuration parameters may be shadowed, i.e., copied, in the always-on area (block 505). In some embodiments, the configuration parameters may be stored in secure region 270 of memory 242, or any other suitable storage location. Once the configuration parameters have been shadowed, further writes to some memory locations may be inhibited (block 506). In some embodiments, a predetermined value may be written to a write lock register, thereby activating circuitry that prevents further updates to lockable registers 260 and secure region 270. The method may then conclude in block 507. If configuration data does not include data that needs to be restored, then the method may proceed as described above from block 506.

It is noted that, in some embodiments, not all of the configuration parameters need be part of the reconfiguration state that is restored to the component on a subsequent power up of the SOC 100. For example, parameters that set various optional features which are not required for basic communication with the component may be set to default values on reconfiguration. Such optional parameters may be read from the suspend to RAM state in the memory 190 after restarting execution on the CPUs 130 for restore to the component. Accordingly, such parameters need not be part of the state stored by the SOC reconfiguration circuit 246. Furthermore, as mentioned previously, in some embodiments the parameters written to the SOC reconfiguration circuit 246 may differ from those programmed into the component at the time the SOC 100 is powered down. In such a case, the parameters written to the SOC reconfiguration circuit 246 may be those that are to be reprogrammed into the component in response to a wakeup of the SOC 100.

Figure 6:
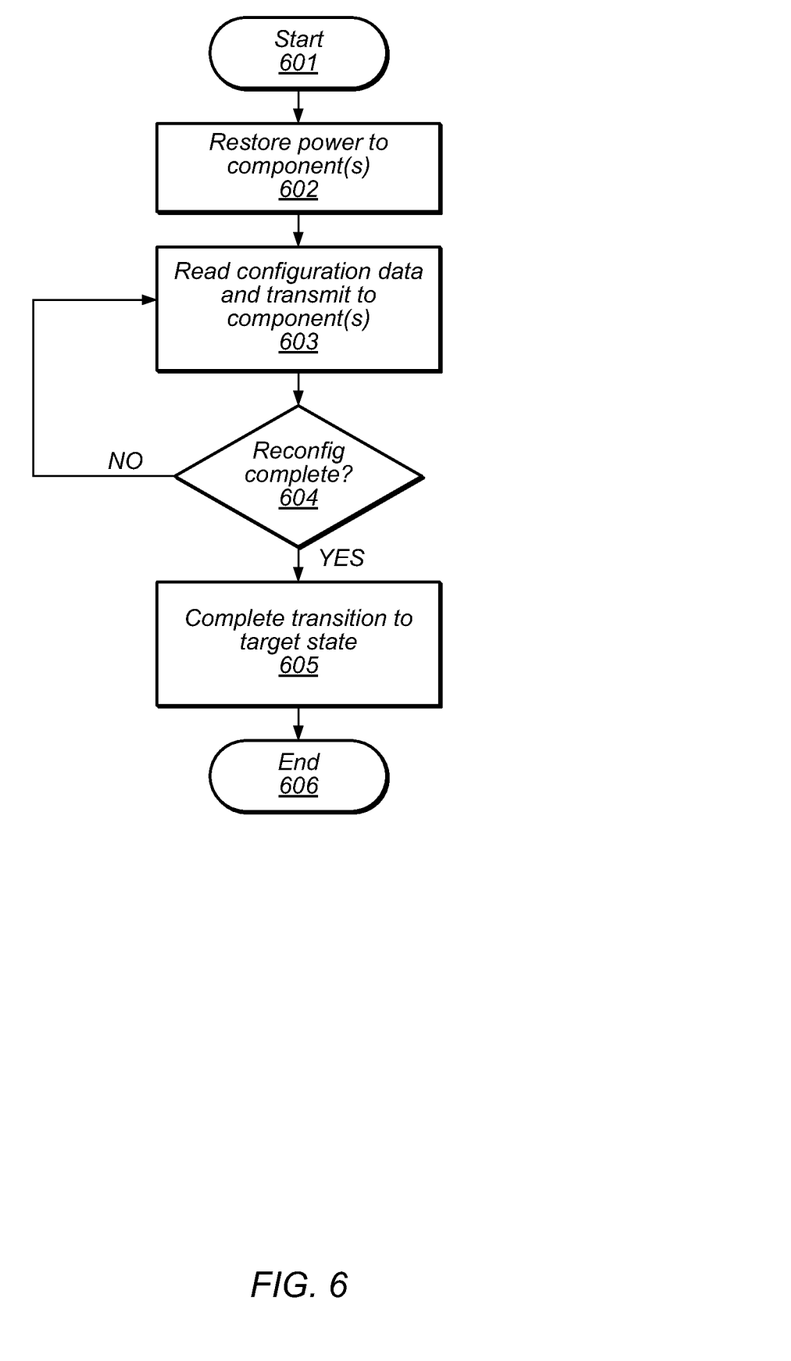
FIG. 6 is a flowchart illustrating operation of one embodiment of the always-on block shown in FIG. 2 during reconfiguration.

Turning next to FIG. 6, a flowchart is shown illustrating operation of one embodiment of the always-on component 160 in response to a determination in the always-on component 160 that one or more components of the SOC 100 are to be powered up again. For example, the operation of FIG. 6 may be part of the transition to the memory access state 302/AO+memory state 402, to restore the memory controller 122 and the communication fabric 127. The operation of FIG. 6 may be part of the transition to the SOC On state 301/SOC On state 401, to restore components throughout the SOC 100. The always-on component 160 may be configured to implement the operation shown in FIG. 6.

The method begins in block 601. The always-on component 16 may be configured to cause a restore of the power of the components being powered up (block 602). For example, the local PMGR 248 may be configured to request that the PMU 156 restore supply voltage to one or more supply voltage rails of the SOC 100. Alternatively, the local PMGR 248 or other circuitry in the always-on component 160 may be configured to control power switches in the SOC 100 to restore power to power gated components. A combination of PMU requests and power switch controls may be used as well.

Once power has stabilized and any component reset has been completed, the SOC reconfiguration circuit 246 may be configured to program the components with the programmable configuration data 256 that corresponds to the component (block 603). The SOC reconfiguration circuit 246 may be configured to read the programmable configuration data 256 and transmit the data to the component. The method may then depend on if the reconfiguration is completed (block 604). Once the reconfiguration has completed, the transition to the new state (e.g. the memory access state 302 or the SOC On state 301) may be completed (block 605). The method may then conclude in block 606.

The transmission may take any form (e.g. programmed input/output (PIO) writes, dedicated communication paths, memory-mapped I/O writes, etc.). In addition to the writes of configuration parameters, some embodiments may support other information in the programmable reconfiguration data 256 to determine status from a component, which may form part of the determination of whether or not reconfiguration is complete (block 604). For example, a series of configuration parameter writes may be transmitted to a component, followed by a polling read to a register that the component updates to indicate completion or readiness to operate, for example.

It is noted that the method illustrated in FIG. 6 is merely an example. In other embodiments, different operations and different orders of operations may be employed.

Figure 7:
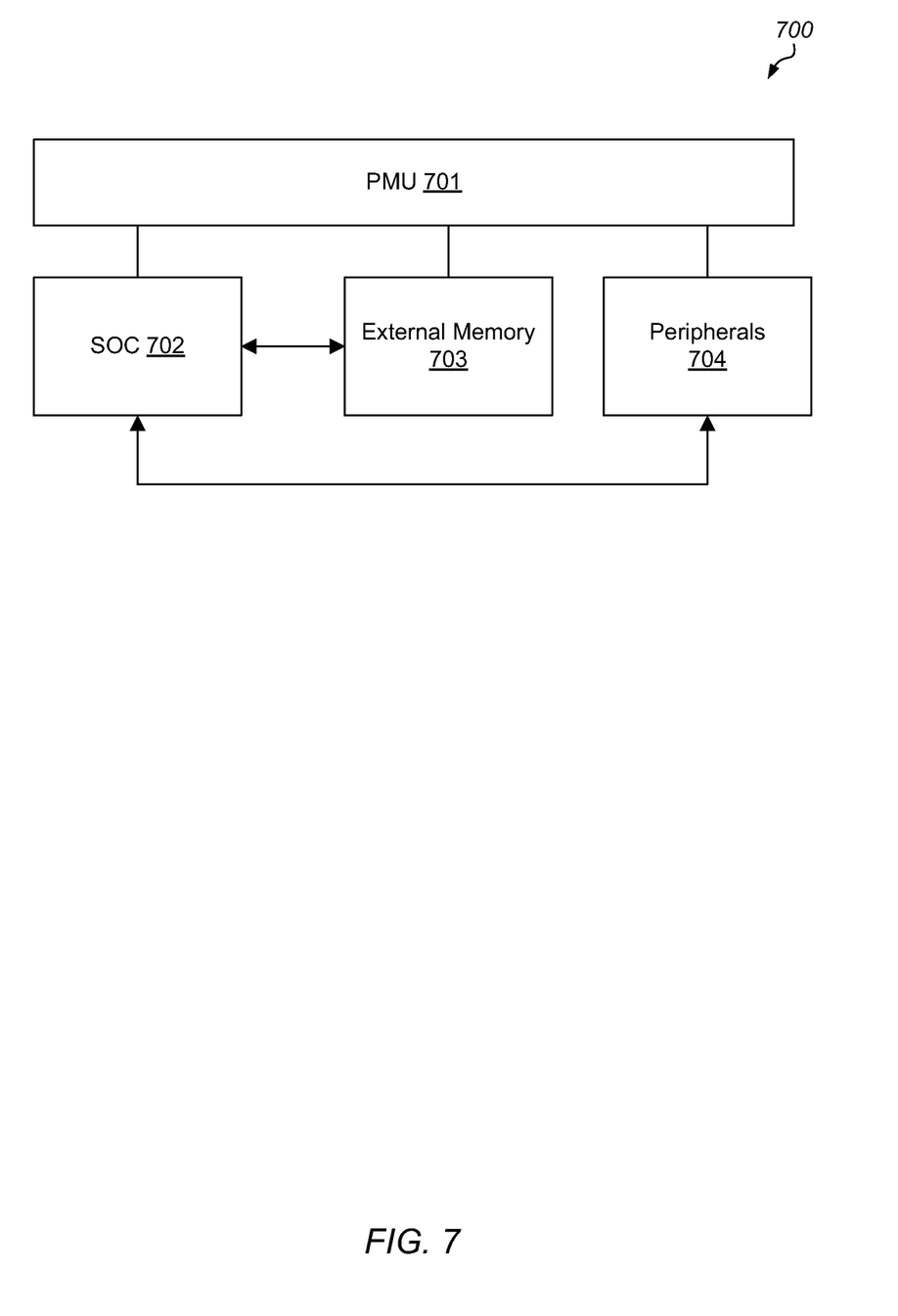
FIG. 7 is a block diagram of one embodiment of a system including the SOC shown in FIG. 1.

Turning next to FIG. 7, a block diagram of one embodiment of a system 700 is shown. System 700 may, in some embodiments, be a mobile device, such as, e.g., a Personal Digital Assistant (PDA), a smartphone, and the like. In other embodiments, system 700 may be any type of computing system such as, e.g., desktop personal computer, laptop, workstation, net top box, etc. In the illustrated embodiment, system 700 includes SOC 702 coupled to one or more peripherals 704 and external memory 703. PMU 701 is provided which supplies the supply voltages to SOC 702 as well as one or more supply voltages to the memory 703 and/or the peripherals 704. In some embodiments, more than one instance of the SOC 702 may be included (and more than one memory 703 may be included as well). It is noted that in various embodiments, SOC 702 may correspond to SOC 100, and PMU 701 may correspond to PMU 156.

The peripherals 704 may include any desired circuitry, depending on the type of system 700. Peripherals 704 may, in various embodiments, include devices for various types of wireless communication, such as wifi, Bluetooth, cellular, global positioning system, etc. The peripherals 704 may also include additional storage, including RAM storage, solid-state storage, or disk storage. The peripherals 704 may include user interface devices such as a display screen, including touch display screens or multitouch display screens, keyboard or other input devices, microphones, speakers, etc.

External memory 703 may include any type of memory. For example, external memory 703 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. External memory 703 may include one or more memory modules to which the memory devices are mounted, such as single inline memory modules (SIMMs), dual inline memory modules (DIMMs), etc. Alternatively, external memory 703 may include one or more memory devices that are mounted on the SOC 702 in a chip-on-chip or package-on-package implementation.

It is noted that the embodiment illustrated in FIG. 7 is merely an example. In other embodiments, different system components, and different arrangements of system components are possible and contemplated.

Figure 8:
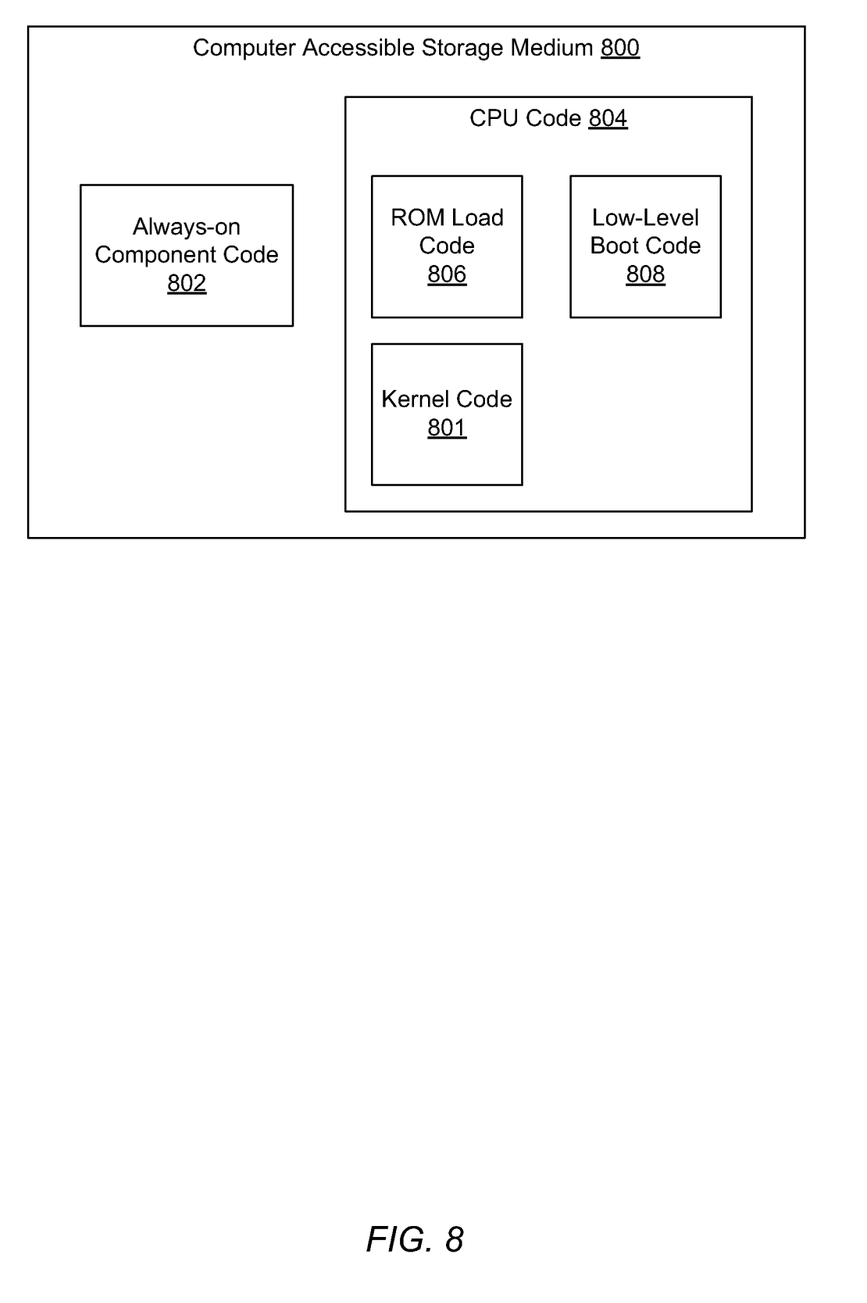
FIG. 8 is a block diagram of one embodiment of a computer accessible storage medium.

FIG. 8 depicts a block diagram of one embodiment of a computer accessible storage medium. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 200 may store data in a non-transitory manner, where non-transitory in this context may refer to not transmitting the instructions/data on a signal. For example, non-transitory storage may be volatile (and may lose the stored instructions/data in response to a power down) or non-volatile.

In the illustrated embodiment, computer accessible storage medium 800 may store always-on component code 802. The always-on component code 202 may include instructions, which, when executed by a processor, such as, processor 240 of FIG. 2, implement the operation described for the code above. The always-on component code 802 may include the processor code 254 shown in FIG. 2, for example. The computer accessible storage medium 800 in FIG. 8 may further include CPU code 804. The CPU code 804 may include ROM load code 806, low-level boot code 808, and/or kernel code 810. A carrier medium may include computer accessible storage media as well as transmission media such as wired or wireless transmission.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims

What is claimed is:

1. An apparatus, comprising:
a peripheral processing circuit;
one or more sensors;
a memory included in an always-on power domain;
a plurality of registers included in the always-on power domain; and
a processor included in the always-on power domain, wherein the processor is, in response to a change in a programmable configuration of the peripheral processing circuit, configured to:
    determine capabilities of the peripheral processing circuit;
    determine one or more configuration parameters for the peripheral processing circuit using the determined capabilities;
    store the one or more configuration parameters in the peripheral processing circuit; and
    during a reduced power mode of the peripheral processing circuit, the processor is further configured to:
        read data from at least one of the one or more sensors;
        filter the data read from the at least one of the one or more sensors; and
        initiate a power mode change of the peripheral processing circuit based on a comparison of an amount of available storage space in the memory to a threshold value;
    following a power mode change of the peripheral processing circuit, the processor is further configured to:
        store at least a portion of the configuration parameters in a portion of the memory;
        store information indicative of a location of the portion of the memory in at least one register of the plurality of registers; and
        lock the portion of the memory and the at least one register from further updates.

2. The apparatus of claim 1, wherein to lock the portion of the memory and the at least one register, the processor is further configured to write a predetermined value into a given register of the plurality of registers.

3. The apparatus of claim 2, further comprising a circuit configured to prevent writes to the portion of the memory and the at least one register, and wherein the processor is further configured to activate the circuit in response to a determination that the predetermined value has been stored into the given register of the plurality of registers.

4. The apparatus of claim 2, wherein the processor is further configured to set a size of the portion of the memory using the information indicative of the location of the portion of the memory.

5. The apparatus of claim 1, wherein peripheral processing circuit includes a graphics processing circuit.

6. A method for operating a computing system, the method comprising:
initiating a transition from a first power state to a second power state, wherein a power consumed by the computing system in the second power state is greater than a power consumed by the computing system in the first power state;
retrieving configuration information from a memory;
in response to determining a peripheral processing circuit is in a reduced power mode:
    reading data, by a processor included in an always-on power domain, from at least one of one or more sensors;

filtering, by the processor, the data read from the at least one of the one or more sensors; and initiate a power mode change of the peripheral processing circuit based on a comparison of an amount of available storage space in the memory to a threshold value;

in response to a change in a programmable configuration of the peripheral processing circuit:

determining, by the processor included in an always-on power domain, capabilities of the peripheral processing circuit;

determining one or more configuration parameters for the peripheral processing circuit using the determined capabilities;

storing the one or more configuration parameters in the peripheral processing circuit; and following a power mode change of the peripheral processing circuit:

storing at least a portion of the configuration parameters in a portion of a memory included in the always-on power domain;

storing information indicative of a location of the portion of the memory in at least one register of a plurality of registers included in the always-on power domain; and locking the portion of the memory and the at least one register from further updates.

7. The method of claim 6, wherein locking the portion of the memory and the at least one register comprises writing a predetermined value into a given register of the plurality of registers.

8. The method of claim 7, wherein locking the portion of the memory further comprises preventing writes to the portion of the memory in response to the writing of the predetermined value into the given register of the plurality of registers.

9. The method of claim 7, further comprising setting a size of the portion of the memory using information indicative of the location of the portion of the memory.

10. The method of claim 6, further comprising reading at least the portion of the configuration parameters from the memory in response to the power mode change of the peripheral processing circuit.

11. The method of claim 6, further comprising unlocking the portion of the memory and the at least one register in response to entry into a power off state.

12. A system, comprising:
a first processor;
a first memory;
one or more sensors;
a second memory included in an always-on power domain;
a plurality of registers included in the always-on power domain; and
a second processor included in an always-on power domain, wherein the second processor is configured to:

while the first processor is in a reduced power mode:

read data from at least one of the one or more sensors;

filter the data read from the at least one of the one or more sensors; and initiate a power mode change of the peripheral processing circuit based on a comparison of an amount of available storage space in the memory to a threshold value;

in response to a change in a programmable configuration of the first processor:

determine capabilities of the first processor;

determine one or more configuration parameters for the first processor using the determined capabilities;

store the one or more configuration parameters in the first processor;

store the one or more configuration parameters in a portion of the second memory;

following a power mode change of the first processor:

store at least a portion of the configuration parameters in a portion of the second memory;

store information indicative of a location of the portion of the second memory in at least one register of the plurality of registers; and lock the portion of the second memory and the at least one register of the plurality of registers from further updates.

13. The system of claim 12, wherein to lock the portion of the second memory and the at least one register the second processor is further configured to write a predetermined value into a given register of the plurality of registers.

14. The system of claim 13, wherein the second processor is further configured to prevent writes to the portion of the second memory and the at least one register in response to a determination that a predetermined value was stored into the given register of the plurality of registers.

15. The system of claim 13, wherein the second processor is further configured to set a size of the portion of the second memory using the information indicative of the location of the portion of the second memory.

16. The system of claim 12, wherein the first processor is configured to process graphics data.

* * * * *